United States Patent [19]
Saito et al.

[11] Patent Number: 6,060,126
[45] Date of Patent: May 9, 2000

[54] METHOD AND APPARATUS FOR MANUFACTURING UNIDIRECTIONALLY REINFORCED RESIN STRUCTURE

[75] Inventors: Koichi Saito; Rikio Yonaiyama, both of Ichihara, Japan

[73] Assignee: Chisso Corporation, Osaka, Japan

[21] Appl. No.: 09/073,983

[22] Filed: May 7, 1998

[30] Foreign Application Priority Data

May 9, 1997  [JP]  Japan .................................. 9-135983

[51] Int. Cl.$^7$ .............................. B05D 1/18; B05C 3/152; B05C 3/172
[52] U.S. Cl. .................................... 427/434.4; 427/434.7; 118/405; 118/420; 156/441
[58] Field of Search .............................. 427/434.4, 434.7; 118/405, 420; 156/441

[56] References Cited

U.S. PATENT DOCUMENTS 4,643,126   2/1987   Wilkinson et al. ..................... 118/420

FOREIGN PATENT DOCUMENTS

| 61-229535 | 10/1986 | Japan . |
| 63-37694 | 7/1988 | Japan . |
| 63-264326 | 11/1988 | Japan . |
| 7-24830 | 1/1995 | Japan . |
| 97/19805 | 6/1997 | WIPO . |

*Primary Examiner*—Katherine A. Bareford
*Attorney, Agent, or Firm*—Wenderoth, Lind & Ponack, L.L.P.

[57] ABSTRACT

A unidirectionally reinforced resin structure is manufactured by an apparatus which comprises a melt resin bath in which a melt resin is stored and into which a long fiber bundle passes, and a plurality of opening pins disposed in the melt resin bath. The long fiber bundle is impregnated with the melt resin and opened by the opening pins during the passing in the melt resin bath. The opening pins are arranged in a perpendicular direction with respect to the melt resin bath and the opening pins are composed of at least two groups in the perpendicular direction so as to open at least two long fiber bundles.

25 Claims, 5 Drawing Sheets

METHOD AND APPARATUS FOR MANUFACTURING UNIDIRECTIONALLY REINFORCED RESIN STRUCTURE

BACKGROUND OF THE INVENTION

The present invention relates to a method and apparatus for manufacturing a unidirectional reinforced resin structure, and more particularly, to a method and apparatus for manufacturing a thermoplastic resin structure which is reinforced by impregnating unidirectionally arranged continuous long fibers with a melt thermoplastic resin. Further, it is to be noted that the term "unidirectionally reinforced resin structure" used herein means a resin structure formed of continuous long fiber bundles which are arranged unidirectionally and reinforced by being impregnated with a melt resin.

Known methods and apparatuses of the kind mentioned below have been disclosed in, for example, Japanese Patent Publication No. SHO 63-37694, Japanese Patent Laid-open Publication No. SHO 63-264326, Japanese Patent Publication No. HEI 5-68327 and WO Publication No. 97-19805.

In the known art of Japanese Patent Publication No. SHO 63-37694, there is disclosed a method of impregnating and reinforcing a long fiber bundle with a melt resin by passing it under tension along a surface of a spreader while contacting the spreader.

Further, in the known art of Japanese Patent Laid-open Publication No. SHO 63-264326, there is disclosed a method in which fiber bundles are spread into a web shape (i.e., band shape). The web is then coated with a melt resin, and thereafter, impregnated with the melt resin during the passing thereof in a specified barrier layer while contacting the barrier. The specified barrier layer is arranged in a zigzag shape in an impregnation die.

In the known art of the Japanese Patent Publication No. HEI 5-68327, there is disclosed a method in which a melt resin is extruded from a tip end of an arc-shaped head of an extruder. At the same time, fiber bundles applied under tension are passed in contact with the arc-shaped head. Thus, impregnation is performed.

In the known art of WO Publication No. 97-19805, there is disclosed a method in which continuous fiber bundles to be reinforced are impregnated by passing between a pair of opening pins disposed in an impregnation die while not contacting the pins.

According to the various methods mentioned above, unidirectionally reinforced resin structures having improved impregnated conditions are obtainable.

However, in the case where the number of reinforcing fiber bundles are scaled-up (for example), a manufacturing apparatus having large structure must be used. This results in a problem of increasing manufacturing costs for the reinforced resin structure, and in addition, the workability (operability) at the time of manufacturing of the unidirectional reinforced resin structure is made extremely worse. This happens because it is important and significant to make a sufficiently wide reinforcing fiber bundle to achieve an improved impregnated condition regardless of the opening impregnation method.

SUMMARY OF THE INVENTION

An object of the present invention is to substantially eliminate defects or drawbacks encountered in the prior art described above. Further, an object of the present invention is to provide a method and apparatus for manufacturing a unidirectional reinforced resin structure capable of reducing space for arranging the manufacturing apparatus with improved workability, even in the case where a large number of reinforcing long fiber bundles for the purpose of the scale-up thereof are used.

The inventors have developed a technology such that reinforcing long fiber bundles are opened in a melt resin bath or tank in a perpendicular direction to thereby make the melt resin bath remarkably small in size (or dimensions). According to such technology, the present invention has been completed.

That is, the above and other objects can be achieved according to the present invention by providing, in one aspect, a method of manufacturing a unidirectionally reinforced resin structure by using a manufacturing apparatus comprising a melt resin bath in which a melt resin is stored and a plurality of opening pins disposed in the melt resin bath so as to open the fiber bundle, the method comprising the steps of:

feeding at least two long fiber bundles into the melt resin bath;

passing the long fiber bundles through the melt resin bath;

impregnating the long fiber bundles during the passing thereof in the melt resin bath by the opening pins arranged into at least-two groups in a perpendicular direction in the melt resin bath, and during the passing of the fiber bundles, the fiber bundles being opened by the opening pins; and drawing the long fiber bundles which have been impregnated with the melt resin the melt resin out of the melt resin bath.

In a preferred embodiment, one of the opening pin groups comprises one opening pin row including at least three opening pins. The long fiber bundle advances in the melt resin bath in a zigzag direction in operative engagement with the opening pins. In a modified configuration, one of the opening pin groups comprises a pair of opening pin rows arranged in parallel and between which the long fiber bundle passes while not contacting the opening pins, and one of the opening pin groups comprises at least three pairs of opening pin rows. The long fiber bundles are bundled into one bundle after being impregnated with the melt resin before being drawn out of the melt resin bath.

In another aspect, there is provided an apparatus for manufacturing a unidirectionally reinforced resin structure, comprising:

a melt resin bath in which a melt resin is stored and into which a long fiber bundle passes; and a plurality of opening pins disposed in the melt resin bath so that the long fiber bundle is impregnated with the melt resin and is opened by the opening pins during the passing in the melt resin bath, wherein the opening pins are arranged along a perpendicular direction of the melt resin bath and the opening pins are composed of at least two groups in the perpendicular direction so as to open at least two long fiber bundles.

In a preferred embodiment, one of the opening pin groups comprises one opening pin row including at least three opening pins. In another embodiment, one of the opening pin groups comprises a pair of opening pin rows arranged in parallel and between which the long fiber bundle passes while not contacting the opening pins. One of the opening pin groups comprises at least three pairs of opening pin rows.

In a more detailed aspect, there is provided an apparatus for manufacturing a unidirectionally reinforced resin structure, comprising:

a melt resin bath in which a melt resin is stored;

an inlet means formed in the melt resin bath through which a long fiber bundle is fed into the bath;

a plurality of opening pins disposed in the melt resin bath so that the long fiber bundle is impregnated with the melt resin and is opened by the opening pins during the passing in the melt resin bath; and an outlet means formed in the melt resin bath through which the long fiber bundle which has been impregnated with the melt resin is drawn out of the bath;

wherein the opening pins are arranged along a perpendicular direction of the melt resin bath and the opening pins are composed of at least two groups in the perpendicular direction so as to open at least two long fiber bundles.

In this aspect, the inlet means comprises a plurality of inlet ports corresponding to the number of the long fiber bundles and the outlet means comprises a plurality of outlet nozzles corresponding to the number of the long fiber bundles.

One of the opening pin groups comprises a pair of opening pin rows arranged in parallel and between which the long fiber bundle passes while not contacting the opening pins. The inlet means comprises a plurality of inlet ports corresponding to the number of the long fiber bundles. The outlet means comprises a single outlet nozzle through which the long fiber bundles impregnated with the melt resin are together drawn outward. A plurality of direction changing pins are disposed at downstream sides of the most downstream side opening pins in their respective groups so that the long fiber bundles impregnated with the melt resin are bundled together.

The constructional elements and terms for the manufacturing apparatus according to the present invention mentioned above will be explained hereunder, respectively.

Unidirectionally Reinforced Resin Structure

The unidirectionally reinforced resin structure mentioned herein includes tape, sheet, rod, wire rod having a rectangular section and the like, which may be optionally selected in accordance with a shape of an outlet nozzle of a melt resin bath mentioned hereinlater. Further, a long unidirectionally reinforced resin structure having a rod shape with a relatively fine diameter of about 1 to 4 mm may be adapted for a general molding process such as injection molding or extruding molding by cutting such resin structure into small ones. Each pellet-shaped unidirectionally reinforced resin structure has a length of about 3 to 50 mm.

Reinforcing Fiber Bundle

There are various known fibers for the present invention which can be used as a long fiber bundle to be reinforced. This may be called hereunder a reinforcing fiber bundle or reinforced fiber bundle, and may be glass fiber, carbon fiber, metal fiber, polymer fiber and the like. Although these fibers may be used solely or in combination, the glass fiber is most preferred in view of its reinforcement strength and availability. Further, it will be pointed out that a glass roving can be used as a continuous glass fiber bundle which has been regularly manufactured and commercially sold. Such a glass fiber bundle has an average fiber diameter of 4 to 30 $\mu$m, filament bundle number (count) of 400 to 10000, and tex yarn number count of 300 to 20000 g/km. Preferably, such a glass fiber bundle has an average fiber diameter of 9 to 23 $\mu$m and filament bundle numbers of 1000 to 6000. In view of the reinforcing effects, it is preferred to treat the surface thereof to improve application or surface adhesiveness with a thermoplastic resin.

Melt Resin

Any kind of thermoplastic resin may be used as a melt resin with which a fiber bundle is impregnated for reinforcement. However, in ordinary usage, a crystalline thermoplastic resin such as polyolefin group resin, polyamide group resin or polyester group resin may be preferably utilized.

In the above crystalline thermoplastic resins, in ordinary usage, the polyolefin group resin may be preferably utilized in the view point of its properties and cost. The polyolefin group resin mentioned herein includes a crystalline single polymer, a crystalline copolymer or combination of them with an $\alpha$-olefin usually having carbon number (count) of 2 to 10 such as ethylene, propylene, 1-buten, 1-penten, 1-hexene, 4-methyl-1-penten, 1-octane or 1-decene. In these compositions, a polypropylene or a crystalline copolymer of propylene, as a main component, and another $\alpha$-olefin will be most widely useable. In the use of these polyolefin group resins, in view of the reinforcement effects, there will be preferred to use a modified polyolefin resin obtained by graft reacting an unsaturated carbonic acid or its anhydride to the polyolefin resin or use a mixture of a polyolefin group resin and a modified polyolefin resin.

In a case of requiring a further improved heat resistance, various kinds of polyamide group resins or polyester group resins may be adopted. As the polyamide group resin, 6-nylon, 6,6-nylon, 12-nylon, 6,10-nylon or the like may be used. As the polyester group resin, polyethylene terephthalate (PET), polybutylene telephthalate (PBT) or the like may be adopted.

Impregnation Bath

The impregnation bath (tank) is a bath in which the melt resin of a predetermined amount is stored while flowing, and preferably, is provided with a heater for adjusting the temperature to a temperature higher than the melting point of the resin to be used. The impregnation bath is provided, for example, with a fiber opening pin, a melt resin supply mechanism, a reinforcing fiber inlet port and a reinforced fiber outlet nozzle, which will be described hereinlater.

Opening Pin

As an opening and impregnating means, a member having substantially a circular section called an opening pin is generally utilized. The opening pin is disposed in the impregnation bath, and the fiber bundles to be reinforced are wound up under tension around the opening pins in zigzag shape to thereby be impregnated, or the fiber bundles are fed between a pair of two opening pins under a contacting or non-contacting condition. During this feeding, the fiber bundles are impregnated with the melt resin. In the present invention, more than two groups of such opening pins are fixedly mounted in a perpendicular direction in the melt bath.

In view of the impregnation effects, it will be desired to dispose three or three pairs of opening pins per one group. These opening pins are arranged linearly or in zigzag shape along the long fiber bundle path. In the case of passing the fiber bundles between the paired opening pins while not contacting the pins, it is of course necessary to arrange the opening pins in a linear manner.

Further, as the opening pin, there may be adopted a freely rotatable one or a stationary one. Although it is desired for the opening pin to have a shape substantially circular in section, other shapes may be used. For example, a shape formed by smoothly cutting corner portions of a polygonal shape may be used and also a circular cylindrical pin having a diameter of 5 to 50 mm may be used.

In the case where the fiber bundles are impregnated with the resin by passing the fiber bundles between the opening pins while not contacting the pins, it may be preferred to use common type opening pins. For example, one disposed on the right side in a certain group of long fiber bundles and one disposed on the left side in another group disposed on the right side of the first mentioned group can be made common. According to this arrangement, the floor space of the apparatus can be further reduced.

According to the passing of the fiber bundles between the opening pins while not contacting the pins, an improved impregnated condition can be obtained with less damage to the fiber bundles, and therefore, even if the apparatus is driven with a high speed (that is, the fiber bundle bundles are fed with a high speed), substantially no feather is generated and a continuous stable production can be sustained. In such case, it is desired that the clearance between the opening pins is 10 D to 500 D (D: average fiber diameter of fibers constituting a fiber bundle to be reinforced). In the case of less than 10 D, there is less merit of high-speed stability and in the case of more than 500 D, the impregnation effect is deteriorated. In the arrangement of increased clearance therebetween, it is desirable to use an opening pin having a large diameter. Further, it may be possible to use all the pins having substantially the same diameter or having slightly different diameters, and in both the cases, no problem will be created.

In the present invention, it will be desirable that one group of the fiber bundles to be reinforced usually include 1 to 5 bundles thereof but not limited to this amount. However, in a case of a great number fiber bundles are in one group, it is necessary to use a melt resin bath having a deeper depth, which results in adverse workability. Since an opened distance of one fiber bundle cannot be made sufficiently large, the impregnation performance will deteriorate, which is inconvenient.

Melt Resin Supply Mechanism

An extruder or extruding machine is usually utilized as a melt resin supply mechanism, and various kinds of the extruders may be utilized, for example, a single axis extruder or a biaxial extruder. The melt resin is supplied through a melt resin supply port formed in the impregnation bath, and the melt resin supply port is usually formed in a top plate, a bottom plate or an upstream side wall section of the impregnation bath.

Reinforcing Fiber Bundle Inlet Port

A reinforcing fiber bundle inlet port is usually formed in the top plate or the upstream side wall section of the impregnation bath. In the case where it is located in the upstream side wall section, the inlet port may have a slit shape suitable for a horizontally rectangular shape corresponding to a sectional shape of the fiber bundles arranged in the horizontal direction. On the other hand, in the case where it is located in the top plate at the upstream side, the inlet port may have substantially the same shape as that mentioned above because of no danger of leakage of the melt resin. However, it may be constructed as a mere large opening because of no danger of flow-out of the melt resin exists.

Outlet Nozzle

The shape of the outlet nozzle provided in a downstream side wall section of the melt resin bath is usually chosen in consideration of the sectional shape of the unidirectional reinforced resin structure to be manufactured.

The sectional area of the outlet nozzle is determined in accordance with the reinforced long fiber bundle amount contained in the desired unidirectionally reinforced resin structure, the base polymer used and the kind of long fiber bundles to be reinforced. For example, a glass fiber roving (specific gravity: 2.6) formed with a fiber bundle number of 4000, having average single fiber diameter of 17 $\mu$m, with a polypropylene (specific gravity: 0.9) and being a matrix can be used, and in the case of using 50 of such fiber ravings with glass fiber content amount of 60 wt % in the unidirectionally reinforced resin structure, the sectional area of the nozzle may be set to about 155 $mm^2$.

After the outlet nozzle stage, cooling equipment, a sizing die for improving rod circularity or surface flatness of a sheet, a shaping cooling roll, etc., and a pelettizer may be further provided. The unidirectionally reinforced resin structure with a rod-shape having relatively fine diameter of about 1 to 4 mm may be cut into small pellets each having a length of about 3 to 50 mm.

According to the manufacturing method and the manufacturing apparatus of the present invention, the apparatus can be made compact even in the case where a large number of reinforcing long fiber bundles are used for the purpose of the scale-up and the like, and thus effectively utilizing the apparatus floor space. Accordingly, increased production cost of the unidirectionally reinforced resin structure can be prevented and the workability during manufacturing can be improved.

The nature and further characteristic features of the present invention will be made more clear from the following descriptions by way of preferred embodiments with reference to the accompanying drawings.

DESCRIPTION OF THE PREFERRED EMBODIMENTS

The preferred embodiments of the present invention will be described hereunder with reference to the accompanying drawings.

FIRST EMBODIMENT

Figure 1:
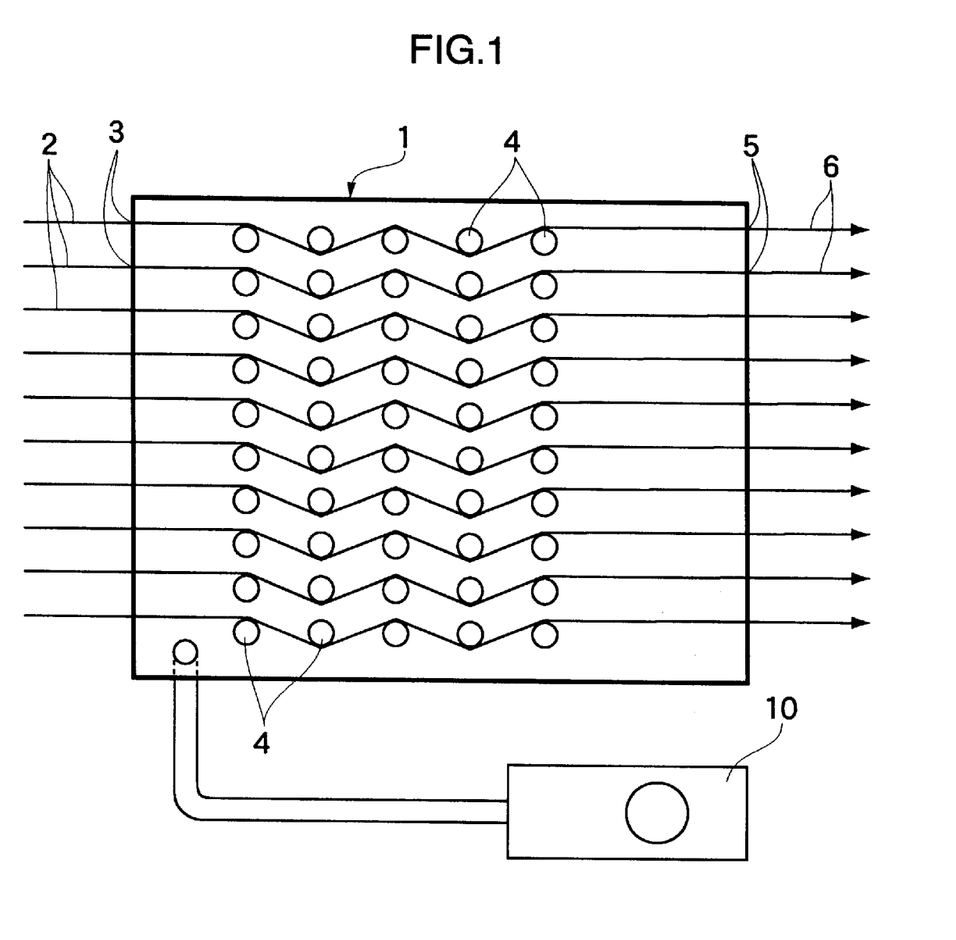
FIG. 1 is a schematic sectional view of a manufacturing apparatus of a first embodiment according to the present invention cut along a horizontally longitudinal direction.

The first embodiment of the present invention is represented by FIG. 1, which is a schematic sectional view of an apparatus, for manufacturing a unidirectionally reinforced resin structure, cut along a horizontal plane thereof.

With reference to FIG. 1, fifty opening pins 4, each having a cylindrical structure, are disposed within a melt resin bath 1 in a fixed manner in a direction substantially perpendicular to the horizontal plane of the bath 1. That is, more concretely, these 50 opening pins 4 are arranged into ten rows, each including five opening pins 4 arranged in zigzag form in an advancing direction of long fiber bundles 2. The pins 4 are arranged in a parallel direction normal to the fiber bundle advancing direction. Each row of the opening pins 4 constitutes one group thereof for performing the opening of the long fiber bundle to be reinforced and impregnated with the melt resin in the bath 1. Accordingly, in this embodiment, ten groups of the opening pins 4 are arranged.

Ten long fiber bundles 2 to be reinforced are introduced into the melt resin bath 1 through respective long fiber bundle inlet ports 3 formed in an upstream side wall section of the bath 1 (left side wall as viewed in FIG. 1). The long fiber bundles 2 advance therein from the left side wall section of the bath 1 while engaging with the opening pins 4 in zigzag form in their respective groups as shown in FIG. 1. During the advancing in the melt resin bath 1, the fiber bundles 2 are opened by contacting the opening pins 4 and are impregnated with the melt resin. The melt resin reinforced fiber bundles 2 are then drawn out through respective circular outlet nozzles 5 formed in a downstream side wall section of the bath 1. Thereafter, the long fiber bundles 2 are water cooled in a cooling bath, not shown, and then each are cut into a plurality of fine pellets having predetermined lengths to form unidirectionally reinforced resin structures.

SECOND EMBODIMENT

Figure 2:
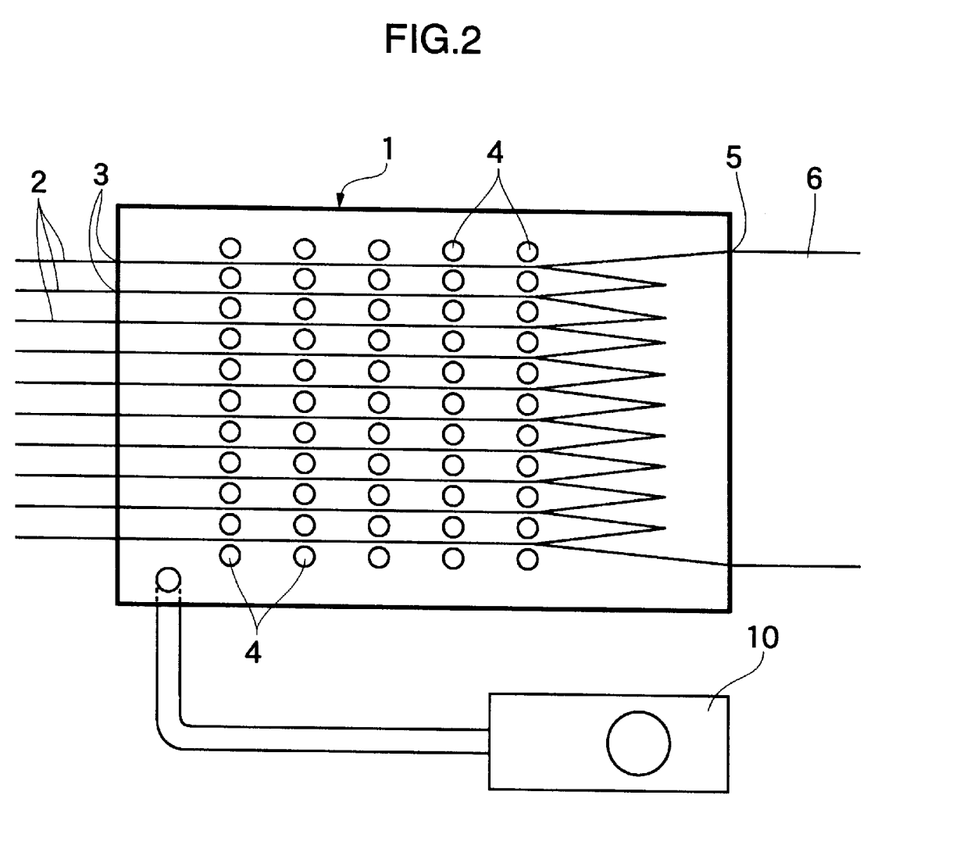
FIG. 2 is a schematic sectional view of a manufacturing apparatus of a second embodiment according to the present invention cut along a horizontally longitudinal direction.

As shown in FIG. 2, in a second embodiment, (as compared with the first embodiment) eleven rows of opening pins 4 are arranged in the bath 1. Each group constitutes five opening pins 4 arranged linearly in the fiber bundle advancing direction. The long fiber bundles 2 advance in the bath 1 while not contacting the opening pins 4. In this second embodiment, the adjacent rows of the opening pins 4 are arranged in pairs each with respect to one long fiber bundle 2 so as to clamp it between bilateral sides thereof. Thus, two adjacent rows of the opening pins 4 constitute one group thereof including five pairs of ten opening pins 4. Further, nine rows of the opening pins 4, except the outermost two rows thereof are utilized commonly with adjacent ones so as to constitute opening pin groups. Thus, ten groups of opening pins 4 are totally constituted in this embodiment. The outlet nozzles 5 of this embodiment have rectangular shapes elongated in a transverse direction to the bath wall. The long fiber bundles 2 drawn out from the outlet nozzles 5 are formed into sheets, which are then shaped and cooled by a pair of nip rolls (not shown).

The other structures or constructions are substantially the same as those of the first embodiment.

THIRD EMBODIMENT

Figure 3:
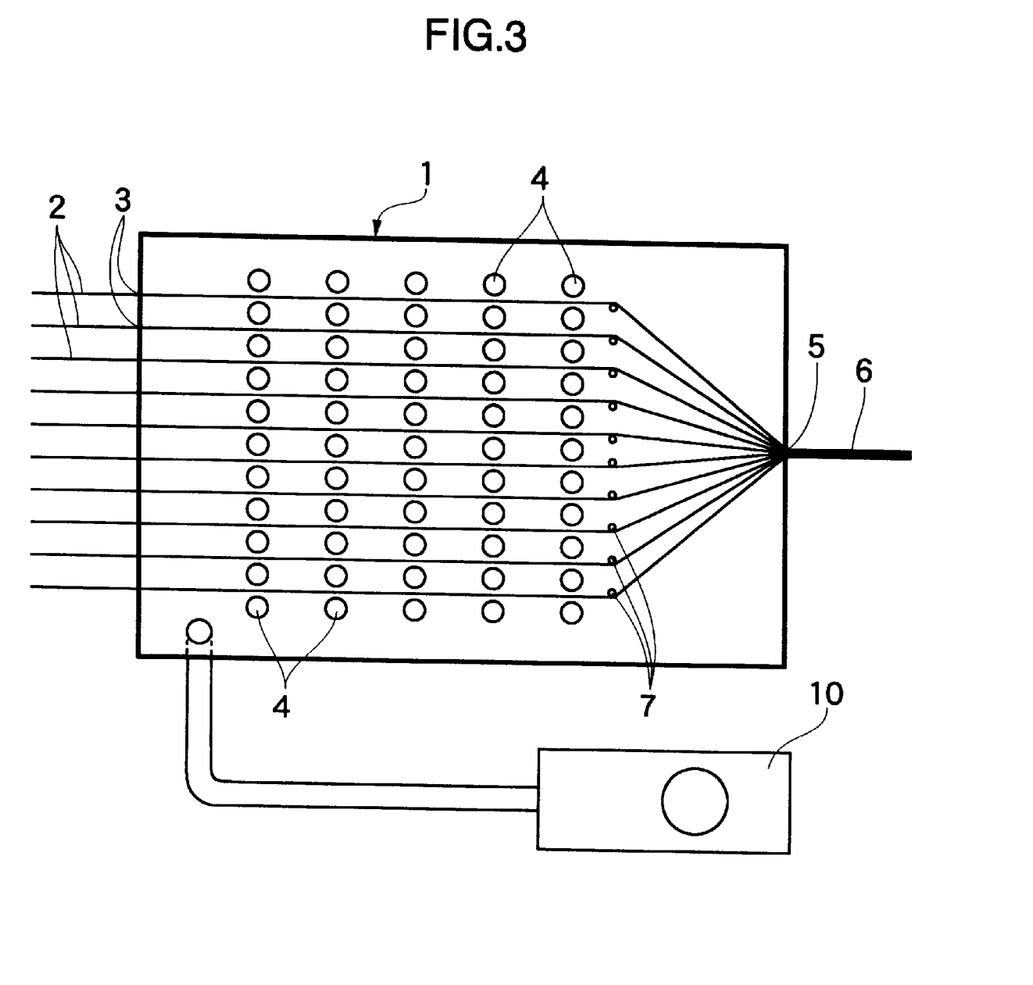
FIG. 3 is a schematic sectional view of a manufacturing apparatus of a third embodiment according to the present invention cut along a horizontally longitudinal direction.

FIG. 3 represents a third embodiment according to the present invention. It differs from the second embodiment in the point that the third embodiment has ten pins 7 for changing the advancing direction of the long fiber bundles 2. The ten pins 7 are disposed near the most downstream side of the opening pins 4 and only one outlet nozzle 5 is formed in the wall section of the bath 1. The outlet nozzle 5 has a circular shape through which all the long fiber bundles 2 are drawn out in one bundle.

In this embodiment, the resin impregnated long fiber bundles 2 are drawn outward as a rod through the circular outlet nozzle 5 and the rod-shaped fiber bundle 2 is thereafter shaped and cooled by a sizing die (not shown).

The other structures or constructions are substantially the same as those of the first embodiment.

Examples for manufacturing the unidirectionally reinforced resin structures by utilizing the method and apparatus of the present invention will be concretely described hereunder.

Hereunder, it is to be noted that the term "opening pin group" means one opening pin block for opening one fiber bundle, and accordingly, the "one group" is composed of one "row" in some examples or composed of "adjacent two rows" in other examples.

EXAMPLE 1

This is an example of a unidirectionally reinforced resin structure manufactured by using the apparatus of the first embodiment shown in FIG. 1.

Fifty opening pins 4, each having a diameter of 8 mm and a height (length) of 40 mm, were arranged in such a manner that five opening pins 4 were disposed with a pitch of 50 mm in the long fiber bundle advancing direction as one row. Ten rows of such opening pins 4 were also arranged in a direction normal to the advancing direction each with a distance (interval) of 2 mm. These opening pins 4 were fixed to a bottom plate of a melt resin bath in perpendicular attitudes.

Ten glass fiber rovings 2 each used as a "long fiber bundle 2 to be reinforced" (average single fiber diameter: 17 $\mu$m, tex yarn number count: 2310 g/Km, collected fiber number: 4000) were arranged horizontally and supplied into the impregnation bath 1 through ten fiber bundle inlet ports 3. Each inlet port 3 had a vertically elongated rectangular shape with dimensions of 1 mm×10 mm, and were formed in the upstream side wall section of the melt resin bath 1. The rovings 2 were then drawn out continuously from the downstream side while passing in the impregnation bath 1 and were engaged with the opening pins 4 in zigzag shape. During this operation, a melt material (melt resin) of a modified polypropylene [maleic acid anhydride modified material (M-PP), crystallization melting point (DSC measurement): 160° C., MFR (230° C., 21.2N): 130 g/10 min] was supplied through an extruder 10, so that the opened rovings 2 were sufficiently impregnated with the melt resin in the impregnation bath 1. The temperature of the impregnation bath 1 was adjusted to 270° C. The widened (opened) width of the roving 2 was about 38 mm, which was sufficient for the height of the opening pins 4.

A minimum necessary width (length in the vertical direction in FIG. 1) of the melt resin bath 1 of this example was as follows:
(diameter of opening pin 4×number of groups)+(interval of the opening pins 4×(group numbers−1)=(8 mm×10)+(2 mm×9)=98 mm=9.8 cm.

Accordingly, even if an apparatus having 100 opening pin rows was designed, the width would be (8 mm×100)+(2 mm×9)=998 mm (98.8 cm) which provides no problem for a practical structure.

The outlet nozzles 5, ten circular nozzles each having a diameter of 2.4 mm, were arranged in one horizontal row with a pitch of 10 mm so that one roving 2 could pass through one outlet nozzle 5. Respective impregnated rovings 6 used as "reinforced long fiber bundles 2 impregnated with the melt resin" drawn out through the outlet nozzles 5 were cooled by a cooling bath. The impregnated rovings 6 were then cut into fine pellets each having 10 mm length and a glass fiber content of 48 wt %.

EXAMPLE 2

This example was executed to manufacture a unidirectional reinforced resin structure by using the apparatus of the second embodiment shown in FIG. 2.

Fifty-five opening pins 4, each having a diameter of 8 mm and a height (length) of 40 mm, were arranged in such a manner that five opening pins 4 were disposed with a pitch of 50 mm in the long fiber bundle advancing direction as one row. Eleven rows of such opening pins 4 were also arranged in a direction normal to the advancing direction with each having a distance (interval) of 1 mm. These opening pins 4 were fixed to a bottom plate of a melt resin bath in perpendicular attitudes.

Ten glass fiber rovings 2 each used as a "long fiber bundle 2 to be reinforced" (average single fiber diameter: 17 µm, tex yarn number count: 2310 g/Km, collected fiber numbers: 4000) were arranged horizontally and supplied into the impregnation bath 1 through ten fiber bundle inlet ports 3. The ten fiber inlet ports 3 each had a vertically elongated rectangular shape with dimensions of 1 mm×10 mm, and were formed in the upstream side wall section of the melt resin bath 1. The rovings 2 were then drawn out continuously from the downstream side while passing in the impregnation bath 1 and while not contacting the opening pins 4. During this operation, a melt material (melt resin) of a modified polypropylene [maleic acid anhydride modified material (M-PP), crystallization melting point (DSC measurement): 160° C., MFR (230° C., 21.2N): 130 g/10 min] was supplied through the extruder 10, so that the opened rovings 2 were sufficiently impregnated with the melt resin in the impregnation bath 1. The temperature in the impregnation bath 1 was adjusted to 270° C. The widened (opened) width of the roving 2 was about 36 mm, which was sufficient for the height of the opening pin 4.

A minimum necessary width (length in the vertical direction in FIG. 1) of the melt resin bath 1 of this example was as follows:
(diameter of opening pin 4×(group numbers+1))+(interval of the opening pins 4×(group numbers)=(8 mm×11)+(1 mm×10)=98 mm (9.8 cm).

Accordingly, even if an apparatus having opening pin group number of 100 was designed, the width would be (8 mm×101)+(2 mm×100)=1008 mm (1.008 m), which provides no problems for a practical structure.

The outlet nozzle 5 was a rectangular nozzle having a vertical length of 0.3 mm and horizontal length of 100 mm. The outlet nozzle 5 was arranged so that ten rovings 2 could pass through this outlet nozzle 5 in the shape of a sheet. The impregnated roving 6 acting as a "reinforced long fiber bundle 2 impregnated with the melt resin" drawn out through the outlet nozzle 5 was shaped and cooled by a pair of shaping rolls (not shown). The obtained sheet had a glass fiber content of 61 wt %.

EXAMPLE 3

This example was executed to manufacture a unidirectionally reinforced thermoplastic resin by using the apparatus of the third embodiment shown in FIG. 3.

Fifty-five opening pins 4, each having a diameter of 8 mm and a height (length) of 40 mm, were arranged in such a manner that five opening pins 4 were disposed with a pitch of 50 mm in the long fiber bundle advancing direction as one row. Eleven rows of such opening pins 4 were also arranged in a direction normal to the advancing direction with each having a distance (interval) of 1 mm. These opening pins 4 were fixed to a bottom plate of a melt resin bath in perpendicular attitudes. Furthermore, ten fiber bundle advancing direction changing pins 7, each having a diameter of 4 mm and a height of (length) of 30 mm, were disposed at downstream side portions of the last opening pins 4 of the respective groups thereof.

Ten glass fiber rovings 2 each used as a "long fiber bundle 2 to be reinforced" (average single fiber diameter: 17 µm, tex yarn number count: 2310 g/Km collected fiber number: 4000) were arranged horizontally and supplied into the impregnation bath 1 through ten fiber bundle inlet ports 3. The ten fiber bundle inlet ports 3 each had a vertically elongated rectangular shape with dimensions of 1 mm×10 mm, and were formed in the upstream side wall section of the melt resin bath 1. The rovings 2 were then drawn out continuously from the downstream side while passing through the impregnation bath 1 and while not contacting the opening pins 4. During this operation, a melt material (melt resin) of a modified polypropylene [maleic acid anhydride modified material (M-PP), crystallization melting point (DSC measurement): 160° C., MFR (230° C., 21.2N): 130 g/10 min] was supplied through the extruder 10, so that the opened rovings 2 were sufficiently impregnated with the melt resin in the impregnation bath 1. The temperature in the impregnation bath 1 was adjusted to 270° C. The widened (opened) width of the roving 2 was about 36 mm, which was sufficient for the height of the opening pin 4.

A minimum necessary width (length in the vertical direction in FIG. 1) of the melt resin bath 1 of this example was as follows:
(diameter of opening pin 4×(group numbers+1))+(interval of the opening pins 4×(group numbers)=(8 mm×11)+(1 mm×10)=98 mm (9.8 cm).

Accordingly, even if an apparatus having opening pin group number of 100 was designed, the width would be (8 mm×101)+(2 mm×100)=1008 mm (1.008 m), which provides no problem for a practical structure.

The outlet nozzle 5, a circular nozzle having a diameter of 6 mm, was arranged. The respective rovings 2 fiber advancing directions were changed by means of the direction changing pins 7 so that ten rovings 2 could pass through this outlet nozzle 5. The impregnated roving 6 used as a "reinforced long fiber bundle 2 impregnated with the melt resin" drawn out through the outlet nozzle 5 was shaped and cooled by a pair of shaping rolls (not shown). The obtained sheet had a glass fiber content of 63 wt %.

COMPARATIVE EXAMPLE 1

Figure 4A:
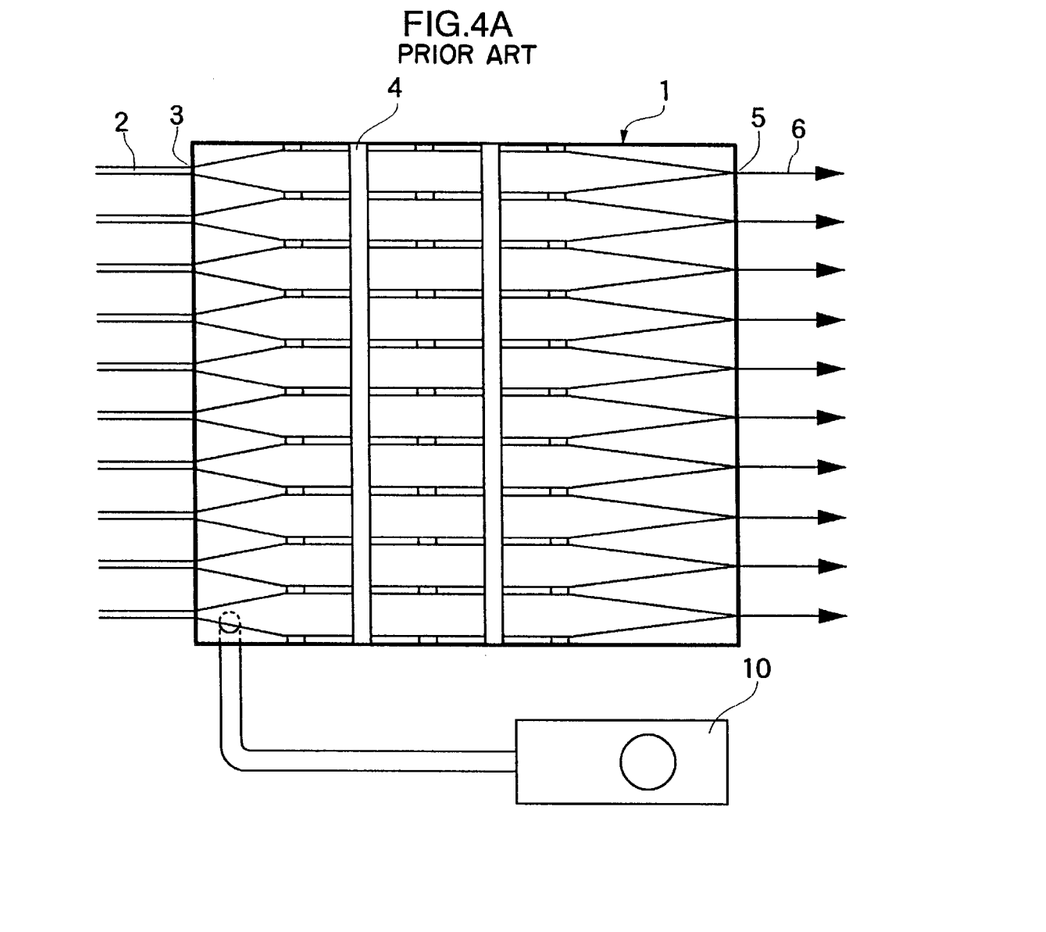
FIGS. 4A and 4B represent a first comparative example, and include schematic sectional views of a manufacturing apparatus of a first comparative example cut along a horizontally longitudinal direction (FIG. 4A) and along a vertically longitudinal direction (FIG. 4B)
Figure 4B:
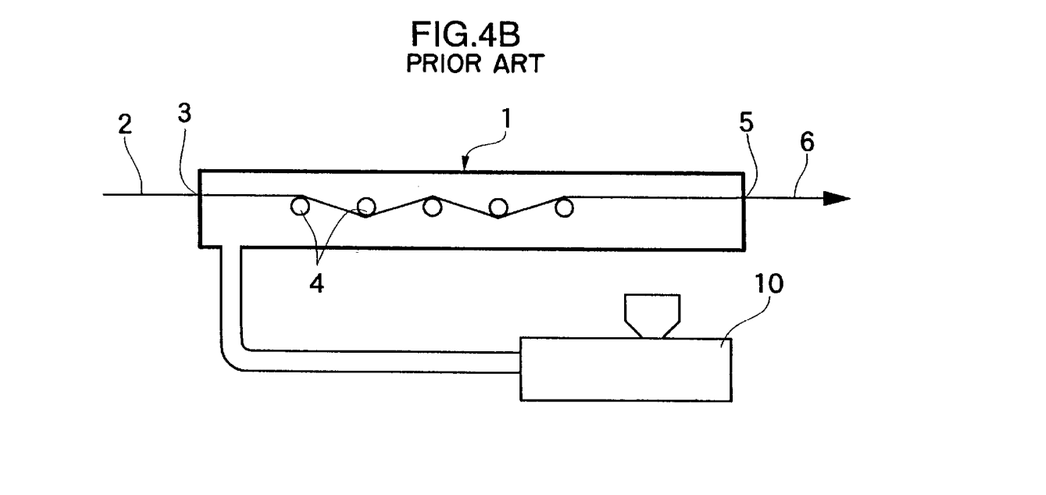

A first comparative example was executed for manufacturing a unidirectionally reinforced resin structure by using a manufacturing apparatus shown in FIGS. 4A and 4B. FIG. 4A is a sectional view along a horizontal direction and FIG. 4B is also a sectional view along a perpendicular direction. In this example, five opening pins 4, each having a diameter of 8 mm and a length of 400 mm, were arranged linearly with a pitch of 50 mm and fixed horizontally in a manner to bridge between both side wall sections of the bath 1.

Ten glass fiber rovings 2 each used as a "long fiber bundles 2 to be reinforced" (average single fiber diameter:

17 μm, tex yarn number count: 2310 g/Km, collected fiber number: 4000) were arranged horizontally and supplied into the impregnation bath 1 through ten fiber bundle inlet ports 3. The ten fiber bundle inlet ports 3 each had a transversely elongated rectangular shape with dimensions of 1 mm×10 mm, and were formed in the upstream side wall section of the melt resin bath 1. The rovings 2 were then drawn out continuously from the downstream side while passing in the impregnation bath 1 and while being engaged with the opening pins 4 in a vertically zigzag shape. During this operation, a melt material (melt resin) of a modified polypropylene [maleic acid anhydride modified material (M-PP), crystallization melting point (DSC measurement): 160° C., MFR (230° C., 21.2N): 130 g/10 min] was supplied through the extruder 10, so that the opened rovings 2 were sufficiently impregnated with the melt resin in the impregnation bath 1. The temperature in the impregnation bath 1 was adjusted to 270° C. The widened (opened) width of one roving 2 was about 38 mm.

A minimum necessary width (length in the vertical direction in a horizontally sectional view such as FIG. 1) of the melt resin bath 1 of this example was as follows:

$$(\text{widened width} \times \text{number of groups}) = 38\,\text{mm} \times 10$$
$$= 380\,\text{mm} \,(38\,\text{cm}).$$

Accordingly, even if an apparatus having opening pin group numbers of 100 was designed, the width would be (38 mm×100)=3800 mm (3.8 m), which is not practical.

Ten circular outlet nozzles 5, each having a diameter of 2.4 mm, were arranged in a horizontal row with a pitch of 38 mm so that one roving 2 could pass through one outlet nozzle 5. Respective impregnated rovings 6 used as "reinforced long fiber bundles 2 impregnated with the melt resin" drawn out through the outlet nozzles 5 were cooled by a cooling bath (not shown). The impregnated rovings 6 were then cut into fine pellets each having 10 mm length with a unidirectionally reinforced resin structure, and having a glass fiber content of 48 wt %.

COMPARATIVE EXAMPLE 2

Figure 5A:
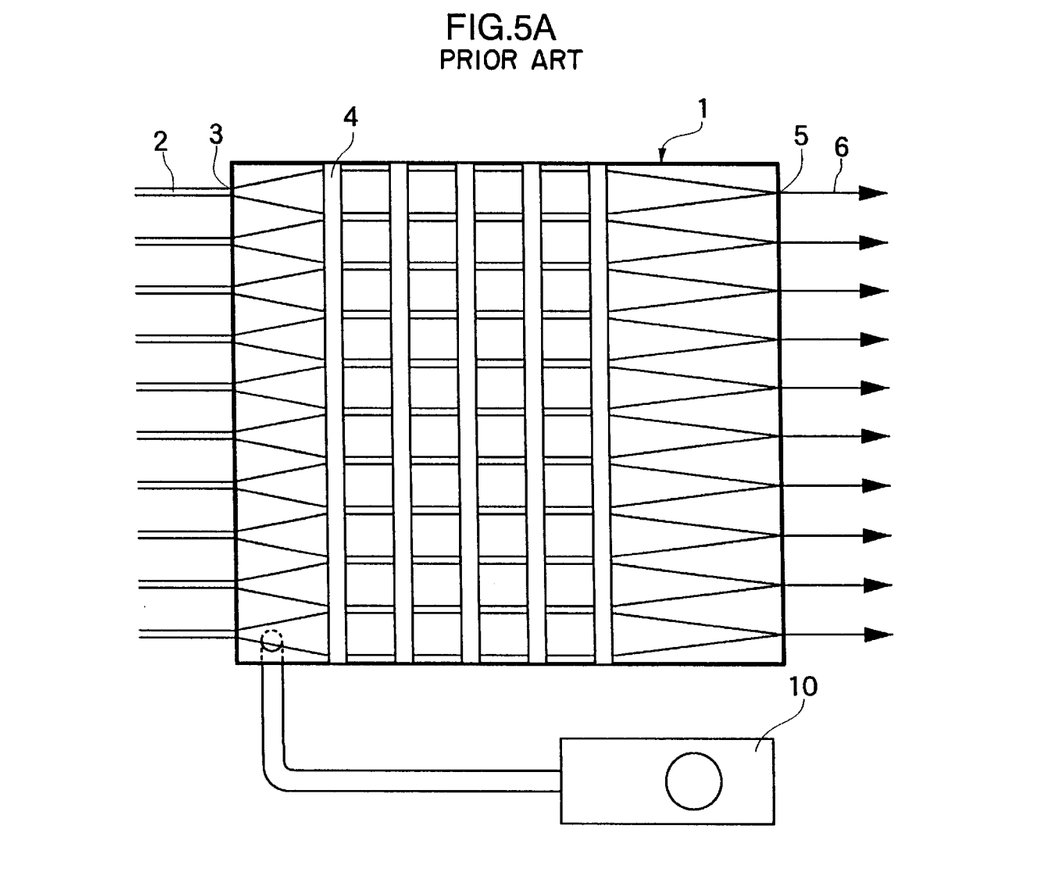
FIGS. 5A and 5B include schematic sectional views of a manufacturing apparatus of a second comparative example cut along the horizontally longitudinal direction (FIG. 5A) and along the vertically longitudinal direction (FIG. 5B).
Figure 5B:
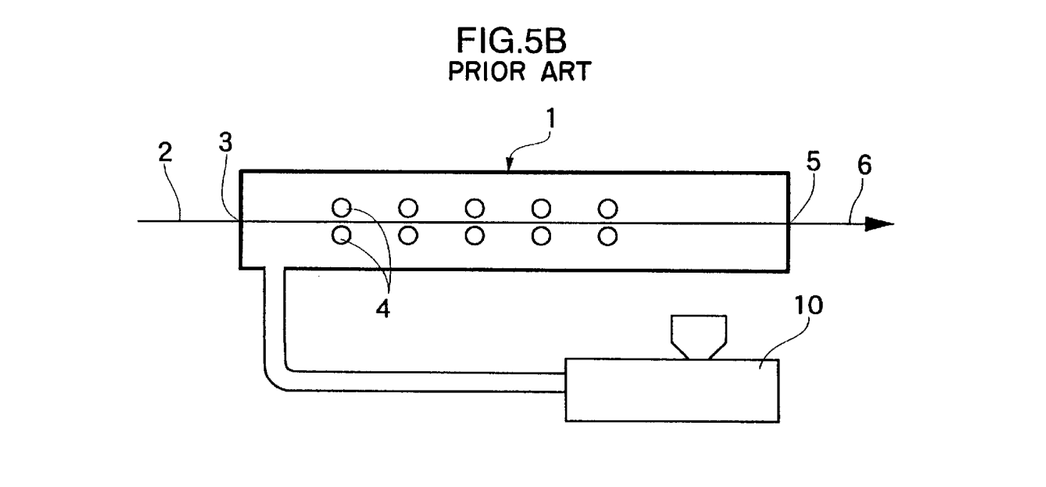

A second comparative example was executed for manufacturing a unidirectionally reinforced resin structure by using a manufacturing apparatus shown in FIGS. 5A and 5B. FIG. 5A is a sectional view along a horizontal direction and FIG. 4B is also a sectional view along a perpendicular direction. In this example, ten opening pins 4, each having a diameter of 8 mm and a length of 400 mm, were arranged in two upper and lower stage rows. Each row included five opening pins 4 arranged linearly with a pitch of 50 mm. Two rows were arranged as one group parallel with respect to each other with a vertical distance of 1 mm and fixed horizontally in a manner to bridge across both side wall sections of the bath 1.

Ten glass fiber rovings 2 each used as a "long fiber bundle 2 to be reinforced" (average single fiber diameter: 17 μm, tex yarn number count: 2310 g/Km, collected fiber number: 4000) were arranged horizontally and supplied into the impregnation bath 1 through ten fiber bundle inlet ports 3. The fiber bundle inlet ports 6 each had a transversely elongated rectangular shape with dimensions of 1 mm×10 mm, and were formed in an upstream side wall section of the melt resin bath 1. The rovings 2 were then drawn out continuously from the downstream side while passing between the upper and lower stages of the openings pins 4 in the impregnation bath 1 and while not contacting the opening pins 4. During this operation, a melt material (melt resin) of a modified polypropylene [maleic acid anhydride modified material (M-PP), crystallization melting point (DSC measurement): 160° C., MFR (230° C., 21.2N):130 g/10 min] was supplied through the extruder 10, so that the opened rovings 2 were sufficiently impregnated with the melt resin in the impregnation bath 1. The temperature in the impregnation bath 1 was adjusted to 270° C. The widened (opened) width of one roving 2 was about 36 mm.

A minimum necessary width (length in the vertical direction in a horizontally sectional view such as FIG. 1) of the melt resin bath 1 of this example was as follows:

$$(\text{widened width} \times \text{number of rows}) = 36\,\text{mm} \times 10$$
$$= 360\,\text{mm}\,(36\,\text{cm}).$$

Accordingly, even if an apparatus having opening pin row number of 100 was designed, the width would be (36 mm×100)=3600 mm (3.6 m), which is not practical.

Ten circular outlet nozzles 5, each having a diameter of 2.4 mm, were arranged in one horizontal row with a pitch of 36 mm so that one roving 2 could pass through one outlet nozzle 5. Respective impregnated rovings 6 used as "reinforced long fiber bundles 2 impregnated with the melt resin" drawn out through the outlet nozzles 5 were cooled by a cooling bath (not shown). The impregnated rovings 6 were then cut into fine pellets each having 10 mm length with a unidirectionally reinforced resin structure, and having a glass fiber content of 48 wt %.

What is claimed is:

1. A method of manufacturing a unidirectionally reinforced resin structure, comprising:
    feeding at least two fiber bundles into a melt resin bath;
    passing said at least two fiber bundles through said melt resin bath;
    impregnating said at least two fiber bundles during said passing, wherein said impregnating includes opening said at least two fiber bundles with at least two groups of opening pins arranged in a perpendicular direction with respect to a horizontal plane through said melt resin bath; and
    drawing said fiber bundles out of said resin bath after said impregnating.

2. A method of manufacturing according to claim 1, wherein said impregnating includes providing one opening pin row that includes at least three opening pins, and wherein at least one group of said at least two groups of opening pins comprises said one opening pin row.

3. A method of manufacturing according to claim 2, wherein said passing includes advancing said at least two fiber bundles in a zigzag direction through said melt resin bath.

4. A method of manufacturing according to claim 1, wherein said impregnating includes parallelly arranging a pair of opening pin rows, wherein at least one group of said at least two groups of opening pins comprises said pair of opening pin rows, and wherein said passing includes moving said at least two fiber bundles between said pair of opening pin rows while not contacting said pair of opening pin rows.

5. A method of manufacturing according to claim 4, wherein said impregnating includes providing at least three pairs of opening pin rows, and wherein said at least one group of said at least two groups of opening pins comprises said at least three pairs of opening pin rows.

6. A method of manufacturing according to claim 1, further comprising bundling said at least two fiber bundles into one bundle after said impregnating and before said drawing.

7. An apparatus for manufacturing a unidirectionally reinforced resin structure from a fiber bundle and a melt resin, comprising:

a melt resin bath adapted to store the melt resin and to allow the fiber bundle to pass therein; and a plurality of opening pins disposed in said melt resin bath, wherein said plurality of opening pins are arranged in a perpendicular direction with respect to a horizontal plane through said melt resin bath and said plurality of opening pins includes at least two groups adapted to open at least two fiber bundles.

8. An apparatus according to claim 7, wherein at least one group of said at least two groups of opening pins comprises one opening pin row including at least three opening pins.

9. An apparatus according to claim 7, wherein at least one group of said at least two groups of opening pins comprises a pair of opening pin rows parallelly arranged with respect to each other and adapted to allow the fiber bundle to pass between said pair of opening pin rows without contacting said pair of opening pin rows.

10. An apparatus according to claim 9, wherein at least one group of said at least two groups of opening pins comprises at least three pairs of opening pin rows.

11. An apparatus according to claim 7, wherein at least one opening pin of said plurality of opening pins has a diameter of 8 mm.

12. An apparatus according to claim 7, wherein at least one opening pin of said plurality of opening pins has a height of 40 mm.

13. An apparatus according to claim 7, wherein said plurality of opening pins are arranged with a pitch of 50 mm in a fiber bundle advancing direction.

14. An apparatus according to claim 7, wherein said plurality of opening pins includes a row of opening pins arranged in a direction normal to a fiber bundle advancing direction and having an interval of 2 mm.

15. An apparatus according to claim 7, wherein said plurality of opening pins includes a row of opening pins arranged in a direction normal to a fiber bundle advancing direction and having an interval of 1 mm.

16. An apparatus according to claim 7, wherein said plurality of opening pins includes a row of opening pins arranged in a zigzag shape.

17. An apparatus according to claim 7, wherein at least one of said plurality of opening pins has a cylindrical shape.

18. An apparatus for manufacturing a unidirectionally reinforced resin structure from a fiber bundle and a melt resin, comprising:

a melt resin bath adapted to store the melt resin and to allow the fiber bundle to pass therein;

an inlet formed in said melt resin bath to allow the fiber bundle to be fed into said melt resin bath;

a plurality of opening pins disposed in said melt resin bath, wherein said plurality of opening pins are arranged in a perpendicular direction with respect to a horizontal plane through said melt resin bath and said plurality of opening pins includes at least two groups adapted to open at least two fiber bundles; and an outlet formed in said melt resin bath through which the fiber bundle is drawn out of said melt resin bath.

19. An apparatus according to claim 18, wherein said inlet comprises a plurality of inlet ports.

20. An apparatus according to claim 19, wherein said outlet comprises a plurality of outlet nozzles.

21. An apparatus according to claim 19, wherein said outlet comprises a single outlet nozzle.

22. An apparatus according to claim 21, further comprising a plurality of direction changing pins disposed at downstream sides of the most downstream side opening pins in their respective groups so that fiber bundles impregnated with said melt resin are bundled together.

23. An apparatus according to claim 19, wherein at least one group of said at least two groups of opening pins comprises a pair of opening pin rows parallelly arranged with respect to each other and adapted to allow the fiber bundle to pass between said pair of opening pin rows without contacting said pair of opening pin rows.

24. An apparatus according to claim 19, wherein said outlet further comprises a circular outlet nozzle.

25. An apparatus according to claim 19, wherein said outlet further comprises a rectangular outlet nozzle.

* * * * *